United States Patent [19]

Huang

[11] Patent Number: 4,669,274
[45] Date of Patent: Jun. 2, 1987

[54] SLUSH AND ICE CREAM MAKER

[76] Inventor: Cheng F. Huang, Fl. 3, 22, La. 20 Sec. 2, Chuang-Shan N. Rd., Taipei, Taiwan

[21] Appl. No.: 822,377

[22] Filed: Jan. 27, 1986

[51] Int. Cl.⁴ ............................................. A23G 9/10
[52] U.S. Cl. .................................... 62/342; 62/346; 165/89; 366/233; 414/433
[58] Field of Search .................. 62/342, 346; 165/89; 366/233; 414/433

[56] References Cited

U.S. PATENT DOCUMENTS

| | | | |
|---|---|---|---|
| 442,659 | 12/1890 | Beard | 62/346 |
| 513,925 | 1/1894 | Harton | 62/346 |
| 1,445,488 | 2/1923 | Clark | |
| 1,631,999 | 6/1927 | Chandler | |
| 2,488,668 | 11/1949 | Knibb | 62/342 |
| 2,511,313 | 6/1950 | Yohe | 259/109 |
| 2,596,876 | 5/1952 | Taecker | 62/342 |
| 2,655,007 | 10/1953 | Lazar | 62/346 X |
| 2,738,082 | 3/1956 | Vernon | 414/433 |
| 2,993,350 | 7/1961 | Smith | 62/342 |
| 3,386,718 | 6/1968 | Abbott | 366/233 |
| 3,711,075 | 1/1973 | Raevsky et al. | 366/233 |
| 3,901,411 | 8/1975 | Bauman | 366/233 X |
| 3,942,769 | 3/1976 | Whiteside et al. | 366/233 X |
| 4,139,992 | 2/1979 | Fraser | 62/345 |
| 4,176,998 | 12/1979 | Whittewich | 414/433 |
| 4,350,430 | 9/1982 | Johnson | 366/233 X |
| 4,565,452 | 1/1986 | Wild | 366/233 X |

FOREIGN PATENT DOCUMENTS 1345890 12/1962 France ........................ 248/172

Primary Examiner—William E. Tapolcai
Attorney, Agent, or Firm—Sheldon & Mak

[57] ABSTRACT

A machine suitable for placement in a freezer for making slush or ice cream in a cylindrical container. The machine comprises: (a) a platform; (b) at least four rollers, namely (i) first and second rollers rotatably mounted about a common first axis of rotation; (ii) third and fourth rollers rotatably mounted about a common second axis of rotation; the first and second axes of rotation being substantially parallel, all four rollers being mounted on the platform, the rollers being capable of supporting a cylindrical container such that the longitudinal axis of the container is substantially parallel to the axes of rotation of the rollers; (c) drive means driving at least one of the rollers, thereby rotating the cylindrical container; (d) means for adjusting the axial distances between the rollers so that the machine can be used for cylindrical containers of various lengths; and (e) means for adjusting the distance between the two axes of rotation, so that the machine can be used for cylindrical containers of various diameters.

11 Claims, 4 Drawing Figures

SLUSH AND ICE CREAM MAKER

The present invention relates to a machine suitable for making slush or ice cream in a freezer, and more particularly to one suitable for making the above products in cylindrical containers of various dimensions.

Hand cranked ice cream freezers have been known for many years. It usually comprises a metal canister in which the ice cream mix is contained, a surrounding vessel holding a freezing mixture (usually ice mixed with salt), "paddles" for stirring the mix, and drive means for the paddles, usually comprising a crank handle and gear train. Laborious hand turning and the need for inconvenient freezing mixtures are the major drawbacks.

Ice cream makers with power driven paddles are known. However, the power requirements are significant. As the ice cream mix progressively freezes, it becomes increasingly difficult to rotate the paddles in the ice cream. When the freezing process is near completion, rotation is very difficult if not impossible. Where the paddles are motor driven, a relatively powerful motor is required. A clutch was often used to prevent overloading the motor. Such items add considerably to the cost of the machine.

U.S. Pat. No. 2,993,350 to Smith discloses an ice cream maker for use in a refrigerator freezer. A cylindrical container with a stirring blade on its inside wall is rotated about its longitudinal axis. The container contains the ice cream mix. The motor is directly engaged to the container via a gear train. However, to fit the drive mechanism, the container has to be custom made. The dimensions of the container are also fixed. Also, the drive unit has a drive shaft which extends through the wall of the freezer unit. That is, the existing freezer has to be modified to accommodate the ice cream maker.

What is needed is a machine that employs a new way of agitating the ice cream mix whereby rotating paddle and the like are obviated. The power requirement for agitating the ice cream should be low. Preferably common household containers of various dimensions can be used in place of expensive custom made containers. Safety is of the utmost concern because the machine can be used in the house, where there may be children who may tamper with the machine. The machine should be inexpensive, and its use in the refrigerator should require no modification of the refrigerator.

SUMMARY

The device of the present invention meets the above needs. It is a machine suitable for placement in a freezer for making slush or ice cream in a cylindrical container. The machine comprises a platform, at least four rollers, namely first and second rollers rotatably mounted about a common first axis of rotation, and third and fourth rollers rotatably mounted about a common second axis of rotation. The first and second axes of rotation are substantially parallel. All four rollers are mounted on the platform. The rollers are capable of supporting a cylindrical container such that the longitudinal axis of the container is substantially parallel to the axes of rotation of the rollers. The machine also comprises drive means driving at least one of the rollers, thereby rotating the cylindrical container. The machine further comprises means for adjusting the axial distances between the rollers so that the machine can be used for cylindrical containers of various lengths, and means for adjusting the distance between the two axes of rotation so that the machine can be used for cylindrical containers of various diameters.

Preferably the platform comprises two separable side by side sections, a first section and a second section. The first and third rollers are mounted on the first section, and the second and fourth rollers are mounted on the second section of the platform. The third and fourth rollers are preferably each mounted on at least one end support.

Preferably the means for adjusting the axial distances between the rollers comprise at least one horizontal support member, wherein at least one section of the platform is slidably received on the support member such that the section is capable of sliding apart from the other section on the horizontal support member, in a direction substantially parallel to the axes of rotation of the rollers, such that the distance between the rollers along their axes of rotation can be varied.

Preferably the means for adjusting the distance between the two axes of rotation comprise the first and second sections of the platform, each having at least one series of holes therein, each series of holes being arranged in a column substantially perpendicular to the axes of rotation of the rollers. The screws each has a head larger than the holes. The screws pass through the holes and threadingly engage the end supports of the third and the fourth rollers thereby removably affixing the two rollers to the platform.

DRAWINGS

These and other features, aspects, and advantages of the present invention will become better understood with reference to the following description, appended claims, and accompanying drawings where:

DESCRIPTION

Figure 1:
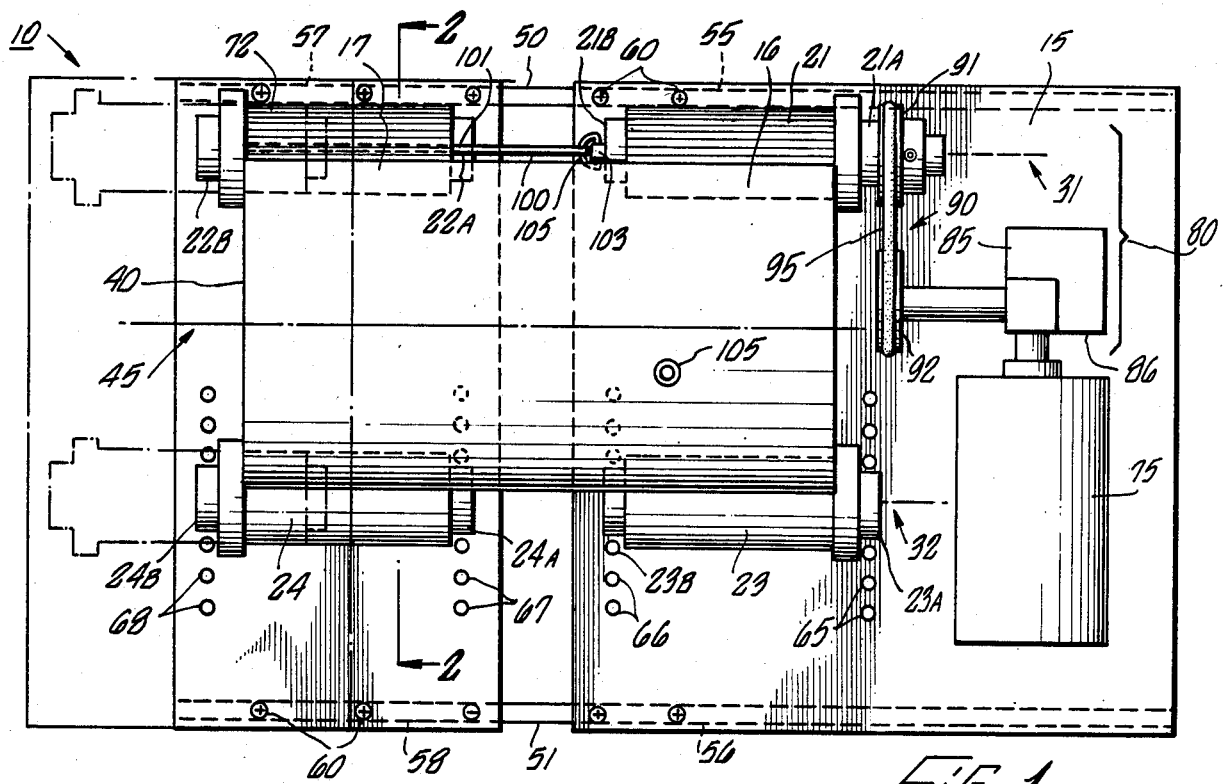
FIG. 1 is a top perspective view of a machine of this invention.

Referring to FIG. 1, the machine 10 comprises a platform 15, preferably comprising sections 16 and 17. Four rollers, namely first roller 21, second roller 22, third roller 23, and fourth roller 24, are rotatably mounted on the platform. preferably the first and third rollers 21 and 23 are mounted on the first section 16, and the second and fourth rollers 22 and 24 are mounted on the second section 17.

The first roller 21 and second roller 22 are rotatably mounted about a common first axis of rotation 31. The third roller 23 and fourth roller 24 are rotatably mounted about a common second axis of rotation 32. The first and second axes of rotation 31 and 32 are substantially parallel.

The four rollers are capable of supporting a cylindrical container 40 such that the longitudinal axis 45 of the container 40 is substantially parallel to the axes of rotation 31 and 31 of the rollers.

There are means for adjusting the axial distance between the first and second rollers 21 and 22, and between the third and fourth rollers 23 and 24, so that the machine can be used for cylindrical containers of various lengths. There are means for adjusting the distance between the axes of rotation 31 and 32 of the rollers, so that the machine can be used for cylindrical containers of various diameters. Preferably each roller is cylindrical in shape, and is rotatably supported on two end supports (21A, 21B; 22A, 22B; 23A, 23B; and 24A, 24B, respectively).

The means for adjusting the axial distance between the rollers can comprise at least one horizontal support member, wherein at least one section is slidably received on the support member such that the section is capable of sliding apart from the other section on the horizontal support member, in a direction substantially parallel to the axes of rotation of the rollers, such that the distance between the rollers along their axes of rotation can be varied. There are also means for fixing the position of the sliding section with respect to the horizontal section.

Figure 2:
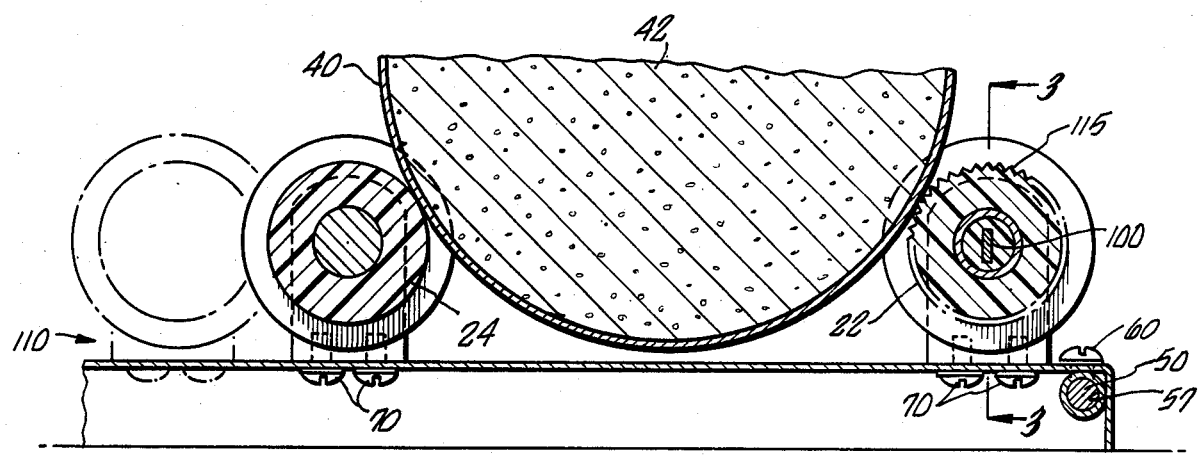
FIG. 2 is a cross-sectional view of FIG. 1 taken along line 2—2.

For example, referring to FIGS. 1 and 2, there can be two peripheral horizontal support members 50 and 51. Preferably the horizontal support member 50 is a rod slidably received in sheaths 55 and 57 in sections 16 and 17, respectively. Preferably the horizontal support member 51 is a rod slidably received in sheaths 56 and 58 in sections 16 and 17, respectively. The sheaths are affixed to the periphery of the sections, and are substantially parallel to the axes of rotation of the rollers. Therefore both sections 16 and 17 are slidably received on the horizontal support members 50 and 51. The sections can slide apart from each other in a direction substantially parallel to the axes of rotation of the rollers, such that the axial distance between the first roller 21 and second roller 22, and the axial distance between the third roller 23 and fourth roller 24, can be adjusted. The axes of rotation 31 and 32 are maintained substantially parallel.

As shown in FIG. 2, the means for fixing the position of the sections 16 and 17 with respect to the horizontal support members 50 and 51 can comprise screws 60 each passing through, and threadingly engaging one of the sheaths (55, 56, 57 or 58). By tightening the screws 60 against the horizontal support members 50 and 51, the screws 60 can render the sections 16 and 17 immobile against the support members 50 and 51 by means of friction.

By adjusting the distance between the separable sections 16 and 17, the axial distance between the rollers can be adjusted. The machine can thus be used for cylindrical container of various lengths.

The means for adjusting the distance between the axes of rotation 31 and 32 can comprise means for removably mounting the third and fourth rollers 23 and 24 on the platform 15. Sections 16 and 17 can each have at least one series of holes therein, each series of holes being arranged in a column substantially perpendicular to the axes of rotation 31 and 32. There are also means for removably mounting the third and fourth rollers 23 and 24 on these holes.

For example, referring to FIGS. 1 and 2, the sections 16 and 17 each have two series of holes (65 and 66 on section 16; and 67 and 68 on section 17). Each of these series of holes is arranged in a column substantially perpendicular to the axes of rotation 31 and 32. Preferably the two series of holes on each section are spaced by a distance about equal to that between the end supports of the roller. In section 16, screws 70, each having a head larger than the holes, each pass through a hole (in series 65 or 66) and threadingly engages one end support (23A or 23B) of the roller 23, thereby removably affixing the roller 23 to section 16. Roller 24 is similarly removably affixed to section 17. The holes are placed such that the rollers 23 and 24 can only be mounted such that they share a common axis of rotation 32, which is parallel to axis of rotation 31 of rollers 21 and 22. By affixing the end supports of the rollers on top of the appropriate holes, the distance between axes of rotation 31 and 32 of the rollers can be adjusted.

There are drive means which drive at least one roller. Referring to FIG. 1, the drive means comprise an electric motor 75, which drives the first roller 21 via drive train 80. Drive train 80 can comprise a torque limiter 85, which disengages the motor 75 from the first roller 21 when the torque exceeds a preset value, and a speed reducer 86, which reduces the rotational speed to a range between about 15 to about 60 rpm. The drive train 80 can comprise a belt drive 90, which consists of two drive wheels 91 and 92, linked by a belt 95. Drive wheel 91 is affixed to roller 23, and drive wheel 92 is driven by the motor 75. Preferably the entire drive train 80 is covered, so that there are no exposed moving belt or drive wheels or the like.

Figure 4:
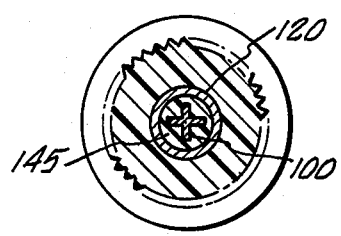
FIG. 4 shows an alternative cross-section of a connector suitable for use with the rollers in the machine of this invention.

Preferably both the first and second rollers, 21 and 22, are driven by the motor 75. For example, connecting means can be used to axially connect the two rollers, so that both are driven at the same time. The connecting means can comprise a rod shaped connector 100 which connects the two rollers. As shown in FIG. 1, one end of the connector 100 is axially connected to a lug 103 by a ring 105. Lug 103 is in turn threadingly and axially engaged to roller 21. The other end of the connector 100 is slidably received in an axial opening 101 in the second roller 22. The axial opening 101 is of substantially the same shape and size as the outside of the connector 100. The rollers 21 and 22 remain axially connected even when the sections 16 and 17 slide apart from each other. Alternatively, connector 100 can also be slidably received in an axially opening in first roller 21. Connector 100 can be of various cross-sections. For example, FIG. 2 shows a connector of rectangular cross-section; FIG. 4 shows a connector of a cross-shaped cross-section. Preferably both driven rollers 21 and 22 have serrations 115 on them to increase the friction between the rollers and the container 40.

Preferably the clearance 110 between the rollers and the platform 15 is at least about ½ inch, so that there is little danger of having fingers being caught between a rotating roller and the platform.

Figure 3:
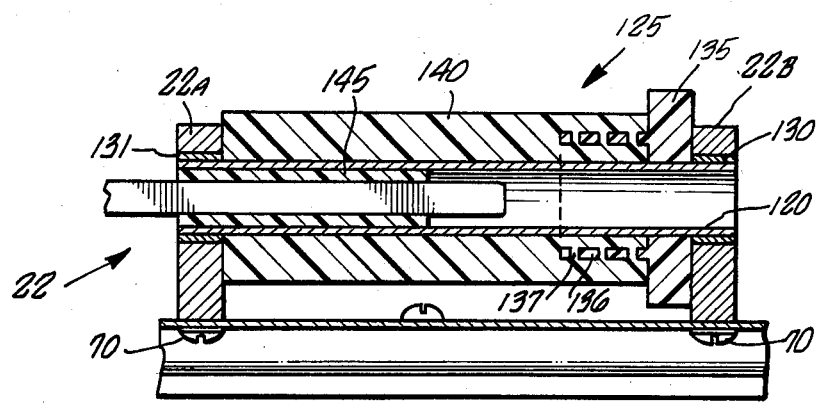
FIG. 3 is a cross-sectional view of a roller suitable for use with this invention, taken along line 3—3 in FIG. 2.

FIG. 3 shows a preferred construction for the rollers. It is a cross-sectional view of the second roller 22. The roller 22 has a hollow tubular core 120. Core 120 can be constructed of stainless steel. Core 120 passes through roller body 125, and extends beyond both ends of it. Core 120 is supported on end supports 22A and 22B by means of bushings 130 and 131. The roller body 125 comprises end stopper 135, and drive portion 140. End stopper 135 has a larger diameter than that of the drive section, and is located on one end of the roller body 125. Container 40 rides only on the drive portion 140 of the roller. End stopper 135 functions to prevent the container 40 from slipping off the machine by travelling in a direction parallel to the axes of rotation of the rollers.

Preferably end stopper 135 is formed of a rigid plastic such as tetrafluroethylene, such as that marketed by Du Pont under the trademark Teflon. Teflon also serves a lubricating function, reducing the friction between the roller 22 and the end support 22B. Preferably the drive section 140 of the roller body is formed of a resilient material which provides substantial friction even at the low temperatures in the freezer environment. For example, a polyurethane rubber sold under the trademark Uniroyal 6008 is suitable for this application.

The polyurethane rubber can also serve to bind the end stopper 135 to the tubular core 120. As shown in Fig. 2, end stopper 135 can have a cylindrical portion 136 projecting along the length of the roller 22. The portion 136 has an internal diameter larger than the external diameter of core 120, and an external diameter smaller than that of drive section 140. There are perforations 137 in the portion 136. The polyurethane rubber used to form the drive section 140 can be poured and cured in-situ over the core 120 and the cylindrical portion 136 of end stopper 135. The cured polyurethane holds on to both the core 120 and end stopper 135, thus forming an integral roller.

The other rollers 21, 23 and 24 can have a construction similar to that of roller 22.

As shown in FIGS. 3 and 4, the hollow tubular core 120 of second roller 22 can be fitted with an insert 145, which can slidably receive connector 100. The hollow tubular core of first roller 21 can threadingly receive lug 103.

The container 40 can be any convenient household container. It is preferably cylindrical, having no abrupt corners in its cross-section. It can be opened in one end or both. Container 40 can be made of glass or transparent plastic such that the contents inside the container can be observed. It can also be made of metal for better heat transfer characteristics. Of course, the machine can also be sold complete with its own container 40. Container 40 can be sealed with a removable cover such that it can be filled with an ice cream mix or slush mix 42, and such that the ice cream or slush can be removed after they have been properly frozen. To increase friction between the container and the driving rollers 21 and 22, there can be friction providing means 43, e.g. bands of slip resistant material such as rubber bands placed around the circumference of container 40.

The machine of the present invention is suitable for use in a household freezer having a door comprising a peripheral resilient sealing strip for keeping the external heat out. An ice cream mix or slush mix 42 is placed into container 40. Preferably the container is only partially filled in order to allow proper mixing, more preferably the container is between about ⅓ to about ½ filled. The container is then sealed. Container 40 is placed on the top of the rollers of machine 10. Machine 10 is placed inside the freezer. The motor 75 is turned on; it rotates the rollers 21 and 22; and thus container 40.

Depending on the final product desired, the content 42 inside the container 40 can be an ice cream mix (for either soft or regular ice cream), or fruit or vegetable juices (for making slush) and the like. The container and its contents are gradually cooled to a freezing temperature. The rotation keeps the contents 42 well mixed and evenly stirred. This prevents lumps from being formed. The content 42 gradually thickens on cooling and finally solidifies. Depending on the amount of the content in the container 40, and the temperature in the freezer, ice cream can be formed in as little as about two hours. When the ice cream or slush is properly frozen, container 40 can be lifted off the rollers, and the ice cream or slush can be removed for consumption.

Preferably machine 10 is placed with the container 40 rotating upwards and away from a user facing the freezer. This reduces the possibility of fingers being caught between the container and the rollers.

Preferably the motor 75 is powered by a power cord 155 extending outside the freezer, the power cord 155 being sufficiently thin so that it can extend outside the freezer without interfering with the proper closure of the freezer door. For example, the power cord can be made by using thin and flat conductors sandwiched in a polyethylene film. The thickness of the cable can be as low as about 0.15 mm. The resilient sealing strip of the freezer door is slightly deformed where the power cord passes out of the freezer, but otherwise maintains a good seal. Preferably power cord 155 allows electricity to flow only when a compressive force is applied to it, e.g., when the freezer door is closed on the power cord 155.

The machine of the subject invention has many advantages. It does not require a custom designed container for holding the ice cream mix. It can accommodate household cylindrical containers of various lengths and circumferences. The user can make a cup of ice cream today, and a couple gallons of slush tomorrow, all with the same machine. The machine has a very simple construction; and is very economical, both to purchase and to operate. Because there are no stirring blades extending inside the container, little power is required to operate the machine. Only the power sufficient for turning the container with its contents is required. Thus a relatively small motor is required.

Further, there are multiple safety features built in. The electricity to the motor is cut off when the freezer door is opened. The drive train is covered up to avoid catching fingers or loose clothing or the like. The clearance between the rollers and the platform prevents fingers from being caught. The container rotates away from the user and thus there is little chance of fingers being caught between the rollers and the container. Even if fingers do get caught, the only weight on the fingers would be that of the container and its contents, because the container is not fixedly connected to the drive train. Also, the container is not rotated by an external force once it is lifted off the rollers. The torque limiter in the drive train provides another safety feature, and also prevents the motor from being overloaded.

Alternatively, the motor can be powered by a low voltage DC current. The motor can be powered by either a battery placed on the platform, or via the same power cord above, which is connected to a transformer/rectifier which steps down the wall outlet AC power into a low voltage DC current. The advantage of low voltage DC current is the elimination of electrical hazards.

Although the present invention has been described in considerable detail with reference to certain versions thereof, other versions are possible. For example, the means for adjusting the axial distance between the rollers, and the means for adjusting the distance between the axes of rotation of the rollers, as described above, can be interchanged. Alternatively, the platform can have a multitude of holes therethrough, arranged in rows and columns, parallel and perpendicular to the axes of rotation of the rollers, respectively. All four rollers can be removably mounted as described above. Further, the platform can comprise four subsections, which are slidably received on two sets of two peripheral support members as described above, one set being parallel to, and one set being perpendicular to, the axes of rotation of the rollers. Also, there can be a levelling indication device 150, such as a spirit level affixed to the platform. This will allow the platform to be levelled horizontally when the machine is placed in the freezer. The levelling indication device is preferably near the center of the platform. Therefore, the spirit and scope of the appended claims should not necessarily be limited to the description of the preferred versions contained herein.

What is claimed is:

1. A machine suitable for placement in a freezer for making slush or ice cream in a cylindrical container, the machine comprising:
   (a) a platform:
   (b) at least four rollers, namely
      (i) first and second rollers rotatably mounted about a common first axis of rotation;
      (ii) third and fourth rollers rotatably mounted about a common second axis of rotation;
   the first and second axes of rotation being substantially parallel, all four rollers being mounted on the platform, the rollers being capable of supporting a cylindrical container such that the longitudinal axis of the container is substantially parallel to the axes of rotation of the rollers;
   (c) drive means driving at least one of the rollers, thereby rotating the cylindrical container;
   (d) means for adjusting the axial distances between the rollers so that the machine can be used for cylindrical containers of various lengths; and
   (e) means for adjusting the distance between the two axes of rotation, so that the machine can be used for cylindrical containers of various diameters;
   wherein the platform comprises two separable side by side sections, being a first section and a second section, wherein the first and third rollers are mounted on the first section and the second and fourth rollers are mounted on the second section, wherein the means for adjusting the axial distance between the rollers comprise at least one horizontal support member, wherein at least one section is slidably received on the support member such that the section is capable of sliding apart from the other section on said horizontal support member in a direction substantially parallel to the axes of rotation of the rollers, such that the distance between the rollers along their axes of rotation can be varied, and the platform further comprises means for fixing the position of the sliding section with respect to the horizontal support member.

2. The machine of claim 1 wherein the means for adjusting the distance between the axes of rotation comprise the first and second sections of the platform, each having at least one series of holes therein, each series of holes being arranged in a column substantially perpendicular to the axes of rotation of the rollers, and means for removably mounting the third and fourth rollers on these holes.

3. The machine of claim 2 wherein the third and fourth rollers are each mounted on at least one end support, and wherein the mounting means comprise screws each having a head larger than the holes, the screws passing through the holes and threadingly engaging the end supports of the third and fourth rollers, thereby affixing the rollers to the platform.

4. The machine of claim 1 comprising means axially connecting the roller driven by the drive means and another roller, such that the drive means drive both rollers.

5. The machine of claim 4 wherein the connecting means comprise a rod shaped connector connected to one of the driven rollers, the connector slidably received in an axial opening in the other driven roller.

6. The machine of claim 1 wherein the roller driven by the drive means has serrations for increasing the friction between the roller and the cylindrical container.

7. The machine of claim 1 wherein the drive means comprises an electric motor.

8. A machine suitable for placement in a freezer for making slush or ice cream in a cylindrical container, the machine comprising:
   (a) a platform;
   (b) at least four rollers, namely:
      (i) first and second rollers rotatably mounted about a common first axis of rotation;
      (ii) third and fourth rollers rotatably mounted about a common second axis of rotation;
   The first and second axes of rotation being substantially parallel, all four rollers being mounted on the platform, the rollers being capable of supporting a cylindrical container such that the longitudinal axis of the container is substantially parallel to the axes of rotation of the rollers;
   (c) drive means driving at least one of the rollers, thereby rotating a cylindrical container, wherein the drive means comprises an electrical motor, and further comprises a torque limiter which disengages the motor when the torque exceeds a preset value;
   (d) means for adjusting the axial distances between the rollers so that the machine can be used for cylindrical containers of various lengths; and
   (e) means for adjusting the distance between the two axes of rotation, so that the machine can be used for cylindrical containers of various diameters.

9. The machine of claim 8 wherein the machine is suitable for placement of a household freezer, said freezer having a door comprising a peripheral resilient sealing strip to facilitate keeping the external heat out, wherein the motor is powered through a power cord extending outside the freezer and wherein the power cord is sufficiently thin to allow the wire to extend outside the freezer without interfering with the proper closure of the freezer door.

10. The machine of claim 9 wherein the power cord allows electricity to flow only when a compressive force is applied to it.

11. A machine suitable for placement in a household freezer for making slush or ice cream in a cylindrical container, the freezer having a door comprising a peripheral resilient sealing strip to facilitate keeping the external heat out, the machine comprising:
   (a) a platform comprising two separable side by side sections, a first section and a second section;
   (b) at least four rollers, namely
      (i) first and second rollers rotatably mounted about a common first axis of rotation;
      (ii) third and fourth rollers rotatably mounted about a common second axis of rotation;
   the first and second axes of rotation being substantially parallel, all four rollers being mounted on the platform, the rollers being capable of supporting a cylindrical container such that the longitudinal axis of the container is substantially parallel to the axes of rotation of the rollers;

wherein the first and third rollers are mounted on the first section, and the second and fourth rollers are mounted on the second section; wherein teh third and fourth rollers are each mounted on at least one end support; and wherein the rollers having serrations for increasing the friction between the roller and the cylindrical container;

(c) drive means driving at least one of the rollers, thereby rotating the cylindrical container, the drive means comprising an electric motor driven by a power cord extending outside the freezer, wherein the power cord is sufficiently thin so that it can extend outside the freezer without interfering with the proper closure of the freezer door, the power cord allowing electricity to flow only when a compressive force is applied to it, the drive means further comprising a torque limiter which disengages the motor when the torque exceeds a preset value;

(d) means for adjusting the axial distances between the rollers so that the machine can be used for cylindrical containers of various lengths, the means comprising at least one horizontal support member, wherein at least one section of the platform is slidably received on the support member such that the section is capable of sliding apart from the other section on the horizontal support member in a direction substantially parallel to the axes of rotation of the rollers, such that the distance between the rollers along their axes of rotation can be varied; the machine further comprising means for fixing the position of the sliding section with respect to the horizontal support member; and (e) means for adjusting the distance between the two axes of rotation, so that the machine can be used for cylindrical containers of various diameters; the means comprising the first and second sections of the platform, each having at least one series of holes therein, each series of holes being arranged in a column substantially perpendicular to the axes of rotation of the rollers, and screws each having a head larger than the holes, the screws passing through the holes and threadingly engaging the end supports of the third and fourth rollers, thereby removably affixing the rollers to the platform

* * * * *